United States Patent
Masuda (10) Patent No.: US 8,767,374 B2
(45) Date of Patent: Jul. 1, 2014

(54) CAPACITORS AND METHOD FOR MANUFACTURING THE SAME

(75) Inventor: Hidetoshi Masuda, Tokyo (JP)

(73) Assignee: Taiyo Yuden Co., Ltd., Tokyo (JP)

(*) Notice: Subject to any disclaimer, the term of this patent is extended or adjusted under 35 U.S.C. 154(b) by 180 days.

(21) Appl. No.: 13/594,517

(22) Filed: Aug. 24, 2012

(65) Prior Publication Data
US 2013/0083454 A1    Apr. 4, 2013

Related U.S. Application Data

(63) Continuation of application No. PCT/JP2011/053626, filed on Feb. 21, 2011.

(30) Foreign Application Priority Data

Feb. 25, 2010 (JP) ................................. 2010-041129

(51) Int. Cl.
*H01G 4/005* (2006.01)

(52) U.S. Cl.
USPC ........... 361/303; 361/305; 361/311; 361/313; 361/503; 361/301.4

(58) Field of Classification Search
USPC ........... 361/303, 305, 301.2, 301.4, 311–313, 361/321.1, 321, 2
See application file for complete search history.

(56) References Cited

U.S. PATENT DOCUMENTS

| 6,370,011 | B1 | 4/2002 | Naito et al. | |
| 6,407,907 | B1 * | 6/2002 | Ahiko et al. | 361/306.3 |
| 7,035,079 | B1 * | 4/2006 | Park et al. | 361/303 |
| 7,084,002 | B2 * | 8/2006 | Kim et al. | 438/104 |
| 7,557,013 | B2 * | 7/2009 | Bhat et al. | 438/396 |
| 8,023,249 | B2 * | 9/2011 | Masuda et al. | 361/303 |
| 8,064,188 | B2 * | 11/2011 | Oakes et al. | 361/303 |
| 8,385,046 | B2 * | 2/2013 | Palusinski et al. | 361/303 |
| 2009/0052110 | A1 | 2/2009 | Masuda et al. | |
| 2009/0086404 | A1 | 4/2009 | Masuda et al. | |

FOREIGN PATENT DOCUMENTS

| JP | 55-77127 A | 6/1980 |
| JP | 55-077127 A | 6/1980 |
| JP | 11-204372 A | 7/1999 |
| JP | 2003-249417 | 9/2003 |
| JP | 2003-249417 A | 9/2003 |
| JP | 2009-021553 | 1/2009 |
| JP | 2009-021553 A | 1/2009 |

(Continued)

OTHER PUBLICATIONS

International Search Report for PCT International Patent Application No. PCT/JP2011/053626, mailed May 10, 2011.

(Continued)

*Primary Examiner* — Nguyen T Ha
(74) *Attorney, Agent, or Firm* — Pillsbury Winthrop Shaw Pittman, LLP (57) ABSTRACT

A capacitor and a manufacturing method thereof with improved capacitance density, simplified production process, and/or improved high frequency characteristic without having to form a nano-scale pattern are provided. A capacitor element 12 includes a dielectric layer made of porous oxide substrate, first and second internal electrodes formed within holes of the porous oxide substrate, a first external electrode electrically connected to the first internal electrode, a second external electrode electrically connected to the second internal electrodes.

6 Claims, 5 Drawing Sheets

(56) References Cited

FOREIGN PATENT DOCUMENTS

| | | |
|---|---|---|
| JP | 2009-049212 | 3/2009 |
| JP | 2009-049212 A | 3/2009 |
| JP | 2009059990 A | 3/2009 |
| JP | 2009-088034 A | 4/2009 |

OTHER PUBLICATIONS

Intl Preliminary Report on Patentability issued Sep. 18, 2012 of PCT/JP2011/053626 filed Feb. 21, 2011 (5 pages).

Non-Final Office Action dated Aug. 27, 2013 of Japanese Patent Application No. 2010-041129 (5 pages).

\* cited by examiner

CAPACITORS AND METHOD FOR MANUFACTURING THE SAME

FIELD OF THE INVENTION

The present Non-Provisional patent application is a national stage continuation application of International Application No. PCT/JP2011/053626, filed on Feb. 21, 2011, which claims priority from Japanese Patent Application No. 2010-41129, filed on Feb. 25, 2010, both of which are incorporated herein by reference.

The present disclosure relates to a capacitor and manufacturing method of the same and more specifically relates to improved capacitance density and high frequency characteristic, simplified manufacturing process, and/or improved dielectric materials of a capacitor.

BACKGROUND

Currently, Al electrolytic capacitors and laminated ceramic capacitors are widely used. Al electrolytic capacitors using electrolyte have problems such as electrolyte leakage. In addition, problems such as thermal contraction between electrodes and dielectric materials may occur since laminated ceramic capacitors are sintered in manufacturing. As a technology to resolve these problems, for example, the following Patent Literatures 1-3 each discloses a capacitor using porous $Al_2O_3$.

Japanese Patent Application Publication No. 2009-88034 ("Patent Literature 1") discloses a capacitor formed of porous $Al_2O_3$ and a manufacturing method thereof where positive and negative electrodes are randomly allocated. According to the manufacturing method disclosed in the Patent Literature 1, the first anodic oxidation of a valve metal is performed to form holes with a desired depth (FIG. 2(C)), and then the second anodic oxidation is performed using a voltage higher than that used for the first anodic oxidation (FIG. 2(D)). As a pitch of holes formed during anodic oxidation is proportional to the applied voltage, a pitch of holes formed using a large voltage becomes larger. The holes formed during the second anodic oxidation are connected to a part of the holes formed during the first anodic oxidation. The bottoms of the holes formed during the second anodic oxidation are subsequently opened (FIGS. 2(E) and 2(F)), and platings are embedded therein whereby conductors are embedded only into the holes formed during the first anodic oxidation and connected to one of the holes formed during the second anodic oxidation but not into the holes that are not connected to any one of the holes formed during the second anodic oxidation (FIG. 3(A)). Next, an insulation cap is formed at the tip end of each of the embedded conductors using a method such as air gap, electrodeposition insulation, or anodic oxidation (FIG. 3(B)). Then, after the surplus dielectric layers ($Al_2O_3$) formed during the second anodic oxidation are removed, the holes formed during the first anodic oxidation are opened (FIGS.(C) and (D)). The same embedding procedures are performed from the opposite side (FIG. 4(A)). Thus, a capacitor structure having internal electrodes allocated on the front and rear surfaces (FIG. 4(C)).

Japanese Patent Application Publication No. 2009-21553 ("Patent Literature 2") discloses a porous $Al_2O_3$ capacitor structure achieving low ESL by using nano-scale lithography. According to the manufacturing method described in the Patent Literature 2, a pair of interdigitate line patterns are formed on the surface of Al prior to performing anodic oxidation (FIG. 2(A)). Anodic oxidation onto the thus formed Al substrate creates a plurality of holes along with the line pattern (FIG. 2(B)). Then, conductive materials are embedded into the holes (FIGS. 2(C) and 3(A)) and the line patterns formed on the main surface are also filled with conductive materials (FIG. 3(C)). Thus, positive and negative electrodes are led out only from the main surface. Japanese Patent Application Publication No. 2009-49212 ("Patent Literature 3") discloses a manufacturing method including filling line patterns formed on the main surface with conductive materials in a similar manner to that described above in connection with the Patent Literature 2 (FIGS. 10(A)-11(A) thereof), removing $Al_2O_3$ leaving the metals (surface electrodes and internal electrodes) (FIG. 11(B)), and filling the clearances with dielectric materials different from $Al_2O_3$ (FIG. 11(C)). According to these structures, an electric current flowing in a positive or negative electrode flows in the opposite direction to the adjacent electrode having an opposite polarity, thereby reducing an inductance due to magnetic field offset.

LIST OF RELEVANT PATENT LITERATURE

Patent Literature 1: Japanese Patent Application Publication No. 2009-88034 (FIGS. 1-4)
Patent Literature 2: Japanese Patent Application Publication No. 2009-21553 (FIGS. 1-3)
Patent Literature 3: Japanese Patent Application Publication No. 2009-49212 (FIGS. 9-11)

SUMMARY

The capacitor described in the Patent Literature 1 intends to achieve high capacity by enlarging the surface of the capacitance lead-out electrodes despite the low relative permittivity of the dielectric layer (for example, a metal oxide (e.g., $Al_2O_3$) substrate). The capacitance lead-out electrodes are formed using a casting mold of a nano-hall array with a high aspect ratio (AR) resulting from anodic oxidation of a metal substrate. Thus, a fine structure may be obtained by arranging a plurality of metal pillars each having a diameter of several 10 nm and AR of several thousands with a pitch of 10 nm, thereby obtaining a large surface area. The inventors have discovered that the capacitor of the Patent Literature 1 has a large Equivalent Series Inductance (ESL) that may lead to deteriorated element characteristics because it is provided with such fine electrodes. A magnetic field offset as described in the Patent Literatures 2 and 3 is an effective method to reduce ESL. However, in order to obtain such a structure, a nano-scale pattern needs to be formed, and forming such a nano-scale pattern may lead to a complicated manufacturing process and high manufacturing costs. In addition, the aforementioned low ESL structure cannot achieve a large capacity since the positive and negative electrodes are arranged in line such that a capacity cannot be created therebetween.

This invention was made in view of the above-mentioned aspects of the related arts. The purpose of various embodiments of the present invention is to provide a capacitor and a manufacturing method thereof with improved capacitance density, simplified production process, and/or improved high frequency characteristic without having to form a nano-scale pattern. The other purpose of the various embodiments includes improving versatility of dielectric materials of the aforementioned capacitor.

A capacitor according to one embodiment of the present invention is substantially cuboid or substantially cubic capacitor including a plurality of cylindrical internal electrodes each having a positive or negative polarity and formed within holes of a porous dielectric material. In one aspect, the capacitor comprises a first external electrode layer formed on one main surface of the capacitor, the first external electrode layer electrically connected to more than one of said plurality of internal electrodes having one of positive or negative polarity, and the first external electrode layer being insulatingly pierced by more than one of said plurality of internal electrodes having the other of positive or negative polarity; an insulating layer formed on the first external electrode layer, the insulating layer being pierced by more than one of said plurality of internal electrodes having the other of positive or negative polarity; and a second external electrode layer formed on the insulating layer in parallel with the first external electrode layer, the second external electrode layer being electrically connected to said more than one of said plurality of internal electrodes having the other of positive or negative polarity. In one aspect of the invention, the porous dielectric material is either of valve metal oxide, multiple oxide, or resin.

A method of manufacturing a capacitor according to one aspect of the invention uses a porous oxide substrate obtained by anodizing a metal substrate. In one aspect, the method comprises a first step of anodizing the metal substrate by applying a voltage to the metal substrate to form a plurality of cylindrical first holes, each of the plurality of first holes being opened in one main surface of the oxide substrate and having a predetermined depth in a thickness direction of the oxide substrate to be filled with electrode material; a second step of anodizing the metal substrate by applying a voltage higher than the voltage applied in the first step to form a plurality of second holes, each of the plurality of second holes having a pitch larger than that of the first holes and being randomly connected to leading ends of some of the first holes; a third step of removing the metal substrate and opening bottom surfaces of the second holes at the other main surface of the oxide substrate; a fourth step of forming a conductive seed-layer on an entire of said one main surface of the oxide substrate; a fifth step of forming first internal electrodes by filling the first holes connected to the second holes with the electrode material; a sixth step of cutting away the oxide substrate at the other main surface of the capacitor to expose end portions of the first internal electrodes by a thickness sufficient to open bottom surfaces of the first holes that are not provided with the first internal electrodes; a seventh step of forming a first electrode layer on the other main surface of the oxide substrate, the first electrode layer having an opening at a position corresponding to the first holes opened by the sixth step, and the first electrode being electrically connected the exposed end portions of the first internal electrodes; an eighth step of enlarging the opening of the first external electrode layer so as to have a larger diameter than that of the first holes to the extent not to reach the first internal electrodes that are connected to the first external electrode layer; a ninth step of forming an insulating layer on bottom and side surfaces of the first external electrode having the opening enlarged in the eighth step; a tenth step of forming second internal electrodes having a diameter substantially identical to that of the first holes by filling the opened first holes with electrode materials to the depth exceeding the first external electrode layer; an eleventh step of removing the insulating layer to expose end portions of the second internal electrode; and a twelfth step of removing the seed-layer and forming a second external electrode layer on the insulating layer such that the second external electrode layer is electrically connected to the end portions of the exposed second internal electrode.

In one aspect, one embodiment of the manufacturing method further comprises a thirteenth step of removing the oxide substrate subsequent to the twelfth step; and a fourteenth step of filling gaps created between the first and second internal electrode in the thirteenth step with a dielectric material, the dielectric material is different from a material of the removed oxide substrate.n embodiment of the invention features that the embodiment includes the process 13 wherein the oxide base material was removed after the process 12 and the process 14 wherein a dielectric material other than the removed oxide base material filled the opening occurred between the first and second internal electrodes. In another aspect, the dielectric material is either of a valve metal oxide, multiple oxide, or resin. In yet another aspect, the dielectric material is a valve metal oxide having higher relative permittivity than that of the oxide substrate.

The other purposes, features and advantages of the invention is to be clarified by the detailed description and the attached drawings.

According to various embodiments of the invention, improved capacitance density and simplified manufacturing process, and improved high frequency characteristics (ESL reduction) are materialized by forming a plurality of internal electrodes each having positive or negative polarities within holes of a porous dielectric substrate and disposing external electrodes, which lead out the internal electrodes, at one main surface of the substrate in parallel with each other. In addition, a wider range of dielectric materials can be used by removing the porous dielectric material and filling another dielectric material.

BRIEF DESCRIPTION OF THE DRAWINGS

FIG. 1 shows an Embodiment 1 wherein FIG. 1(A) shows a sectional view of a capacitor according to the Embodiment 1 and FIG. 1(B) shows a breakdown perspective view of a part of an capacitance generating portion of a capacitor element.

DETAILED DESCRIPTION OF THE INVENTION

Various embodiments of the present invention will be explained below in line with various examples.

Embodiment 1

Figure 1:
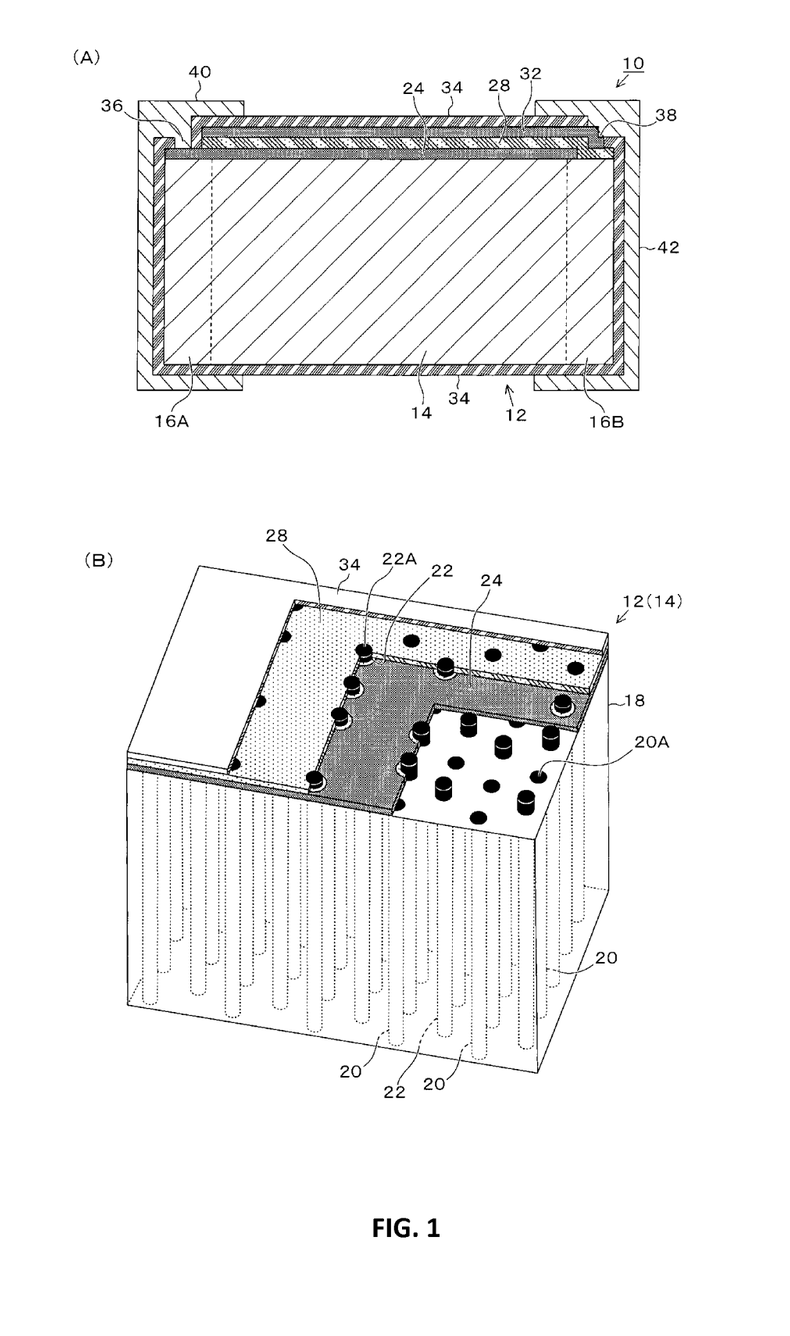
Figure 2:
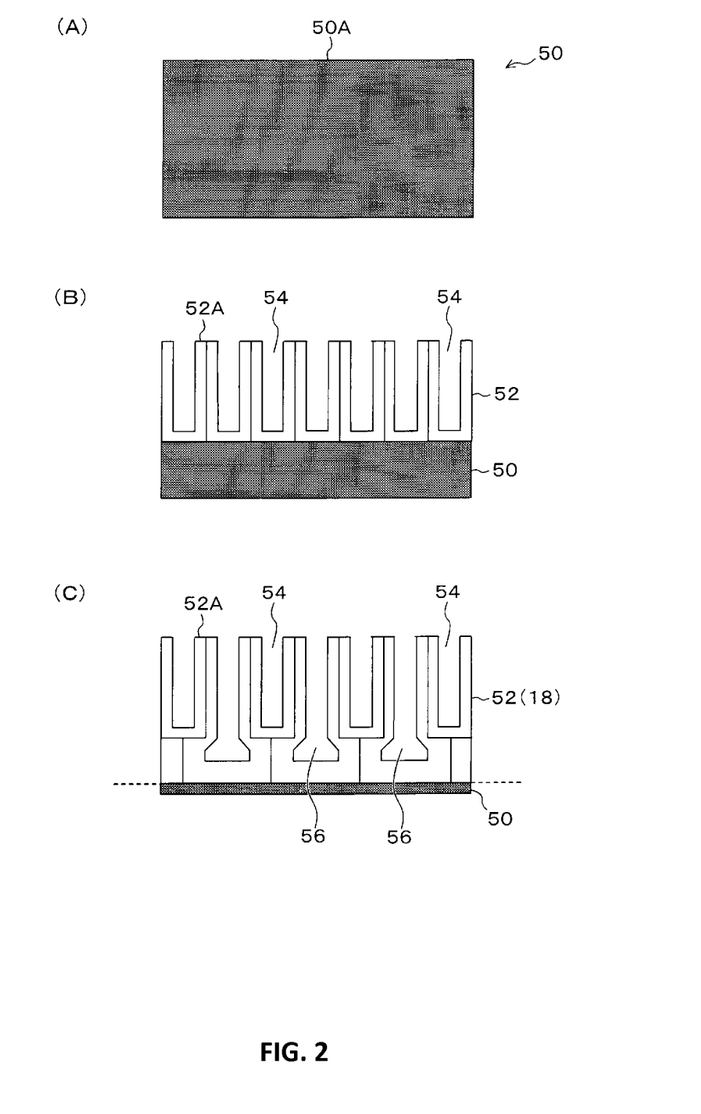
FIG. 2 shows an example of manufacturing process of the Embodiment 1.
Figure 3:
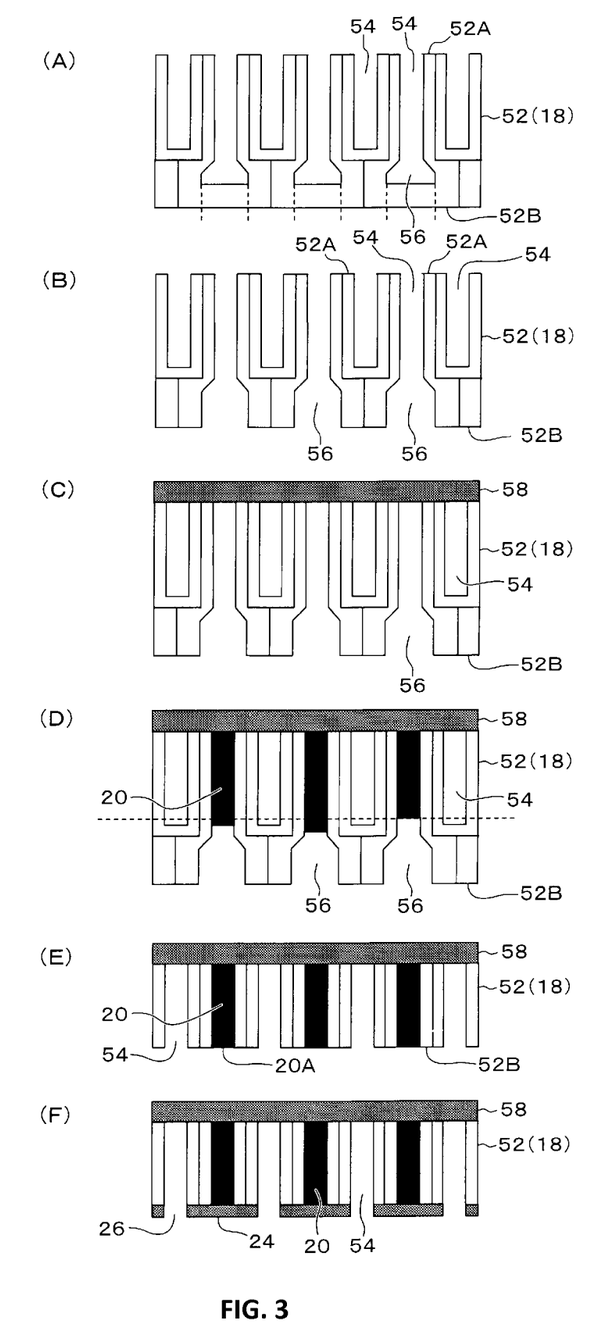
FIG. 3 shows an example of manufacturing process of the Embodiment 1.
Figure 4:
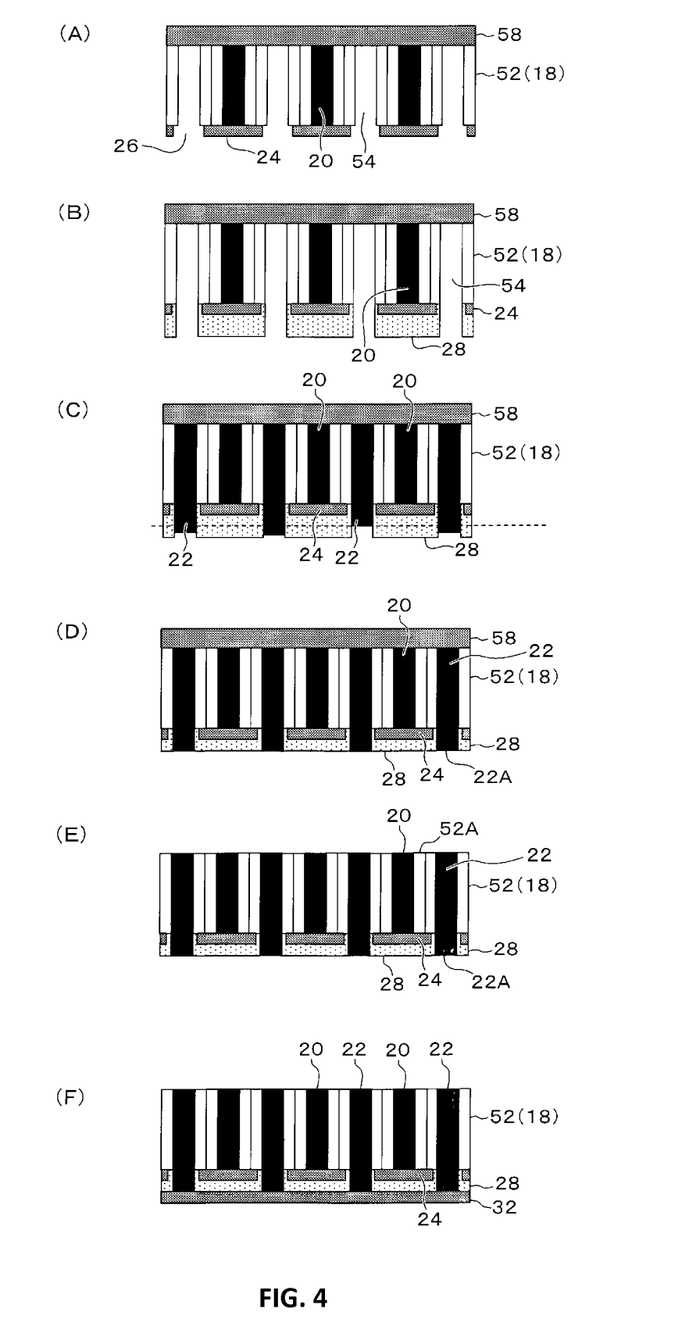
FIG. 4 shows an example of manufacturing process of the Embodiment 1.

First with reference to FIGS. 1-4, the Embodiment 1 of the present invention will be described. FIG. 1(A) shows a sectional view of a capacitor according to the Embodiment 1; and FIG. 1(B) shows a breakdown perspective view of a part of an capacitance generating portion of a capacitor element. FIGS. 2-4 show an example of manufacturing process of the Embodiment 1. As shown in FIG. 1(A), a capacitor 10 according to the Embodiment 1 includes a capacitor element 12 as a main portion thereof. The capacitor element 12 includes a capacitance generating portion (or internal electrodes containing region) 14 and non-contributing portions (or internal electrodes non-containing region) 16A and 16. As shown in FIG. 1(B), the capacitance generating portion 14 includes a dielectric layer 18, a plurality of cylindrical first internal electrodes 20 disposed within the dielectric layer 18, and a plurality of cylindrical second internal electrodes 22 disposed within the dielectric layer 18. The capacitor element 12 includes a first external electrode 24 formed on the front surface and electrically connected to the first internal electrodes 20, an insulating layer 28 formed on the first external electrode 24, and a second external electrode 32 formed on the insulating layer 28 and electrically connected to the second internal electrodes 22. The insulating layer 28 intervenes between the first external electrode 24 and the second internal electrodes 22 so as to insulate the first external electrode 24 and the second internal electrodes 22.

Disposed on the outer suraface of the capacitor element 12 is a protective layer 34. An exposing portion 36 is formed on the protective layer 34 such that a part of the first external electrode 24 is exposed. Also formed on the protective layer 34 is an exposing portion 38 that allows a part of the second external electrode 32 to be exposed. A pair of terminal electrodes 40 and 42 are formed on the both sides of the capacitor element 12 so that the terminal electrode 36 and 38 are electrically connected to the terminal electrodes 40 and 42, respectively. The first and second internal electrodes 20 and 22 each have large aspect ratios and are randomly arranged as shown in FIG. 1(B). In this embodiment, each of the first internal electrodes 20 has a positive polarity while each of the second internal electrodes 22 has a negative polarity. The allocation of the positive and negative polarities may be inversable.

Materials used to form the dielectric layer 18 may include oxides of valve metals (e.g. m Al, Ta, Nb, Ti, Zr, Hf, Zn, W, or Sb). The first and second internal electrodes 20 and 22 may be made of platable general metal (e.g., Cu, Ni, Co, Cr, Ag, Au, Pd, Fe, Sn, Pb, or Pt) and/or alloys thereof. Metals to form the first and second external electrodes 24 and 32 may include general metal (e.g., Cu, Ni, Cr, Ag, Au, Pd, Fe, Sn, Pb, Pt, Ir, Rh, Ru, or Al). The protective layer 34 may be made of an insulator such as resin or metal oxides such as $SiO_2$ or SiN. Materials to form the terminal electrodes 40 and 42 may include Cu, Ni, Au, solder, and/or laminated materials thereof.

As example of dimension for the components of the capacitance generating portion 14, a thicknesses of each the first and second external electrodes 24 and 32 may be in the range of several 10 nm to several μm; a diameter of each of the first and second internal electrodes 20 and 22 may be in the range of several 10 nm to several 100 nm; and a length of the same may be in the range of several 100 nm to several 100 μm. In addition, an interval between the adjacent internal electrodes may be in the range of several 10 nm to several 100 nm; an interval between an internal electrode and external electrode (i.e., a thickness of the insulating layer 28) may be in the range of several 10 nm to several 10 μm; and a thickness of the dielectric layer 18 may be in the range of several 100 nm to several 100 μm. The protective layer 34 may be formed to have the thickness of several 10 nm to several 10 μm.

Next, with reference to FIGS. 2-4, a manufacturing method of a capacitor element in accordance with the embodiment will be described. For a convenience of explanation, FIGS. 2-4 illustrates components corresponding to the capacitance generating portion 14 of the capacitor element 12 only and do not include components corresponding to the non-contributing portions 16A and 16B disposed on the both sides thereof. As shown in FIG. 2(A), a metallic substrate 50 made of the aforementioned valve metal is prepared. Then, a plurality of pits (not shown), which become starting points of anodic oxidation, are formed in closest packing hexagonal array on a surface 50A of the metallic substrate 50. Next, first holes 54 are formed at desired depth (or length) in a thickness direction of the oxide substrate 52 in such a manner to be opened in the main surface 52A by subjecting the metallic substrate 50 to anodization under application of a voltage, as shown in FIG. 2(B). Subsequently, second holes 56 are formed on the oxide substrate 52 by subjecting the oxide substrate 52 to anodization under application of a lager voltage than the voltage applied for the first holes 54. Since a pitch of the holes (an interval between the holes) formed by the anodization is proportional to the applied voltage, a pitch of the second holes 56 formed under a larger voltage become large and accordingly are randomly connected to some of the first holes 54 formed in the previous process. In this embodiment, the oxide substrate 52 is used as the dielectric layer 18.

The first anodization shown in FIG. 2(B) is carried out under conditions of application voltage of several V to several 100 V and processing time of several minutes to several days. The second anodization shown in FIG. 2(C) is carried out under conditions of application voltage which is several times as large as the first application voltage and processing time of several minutes to several tens minutes. For example, the first holes 54 are formed at diameter of about 100 nm if the first application voltage is 40V, while the second holes 56 are formed at diameter of about 200 nm if the second application voltage is 80V. When the second application voltage falls within the above-mentioned range, the number of first holes 54 connected to the second holes 56 may become substantially equal to the number of first holes 54 not connected to the second holes 56. Accordingly, the number of first electrodes 20 formed within the first holes 54 connected to the second holes 56 may become substantially equal to the number of second electrodes 22 formed within the first holes 54 not connected to the second holes 56, thereby making it possible to take out capacity of the capacitor with efficiency. In addition, when the second processing time falls within the above-mentioned range, sufficient transformation of the pitch of the holes can be achieved to decrease thickness of the oxide substrate formed in the second anodization. Since the oxide substrate formed in the second anodization is removed in a later process, it is preferably as thin as possible.

Next, under the condition shown in FIG. 2(C), a base metal portion of the metallic substrate 50 is removed, the dielectric layer 18 is cut away by a predetermined thickness, as shown in FIG. 3(B) such that end portions of the second holes 56 are opened in a rear surface 52B of the oxide substrate 52 (FIG. 3(B)). The opening process is carried out using, for example, wet-etching by phosphoric acid or dry-etching by chlorinated gas. Then, as shown in FIG. 3(C), a conductive seed-layer 58 is formed on the main surface 52A of the oxide substrate 52 by an appropriate method such as PVD or the like. Next, as shown in FIG. 3(D), the first electrodes 20 are formed by filling the first holes 54 connected to the second holes 56 with a plating conductor as a material for electrodes, using the seed-layer 58 as a seed. At this point, since the end portions of the first holes 54 not connected to the second holes 56 are not opened, they are not filled with the plating conductor. The plating conductor is filled up to a position adjacent to the end portions of the first holes 54.

Next, the oxide substrate 52 is cut away as indicated by a dotted line in FIG. 3(D) such that the end portions 20A of the first internal electrodes 20 are exposed and the bottom portions of the first holes 54 not filled with the first internal electrodes 20 are opened, as shown in FIG. 3(E). In order to prevent penetration of CMP slurry abrasives into the holes, a fixed abrasive type CMP process may be preferably used. Next, as indicated by FIG. 3(F), first external electrodes 24 are formed on the main surface 52B of the oxide substrate 52. Each of the external electrodes 24 has an opening 26 at the position corresponding to the first holes 54 formed in the process shown in FIG. 3(D). Each of the external electrodes 24 is conducted to the exposed end portions 20A of the first internal electrodes 20. It is preferable to make a thickness of the first external electrode 24 thin by using anisotropic layer forming method such as PVD, including vapor deposition or spattering in order not to close the opened first holes 54 and in order to form the layer of the first external electrode 24 only on the main surface 52B of the oxide substrate. Next, as shown in FIG. 4(A), the opening 26 is enlarged so as to have a larger diameter than the diameter of the first holes 54 to the extent not to reach the first internal electrodes 20. The enlargement process is carried out to insulate the first external electrodes 24 and the second internal electrodes 22, which will be described hereinafter. In the process, an isotropic and mild wet-etching is preferably used since the first external electrodes 24 need to be left on the adjacent first internal electrodes 20.

As shown in FIG. 4(B), an insulating layer 28 is formed on the first external electrodes 24. The insulating layer 28 is formed on the bottom and side surfaces of the first external electrodes 24 in a similar manner to the layer forming method as used in forming the first external electrode 24. Next, the second internal electrodes 22 are formed on the first holes 54 which are opened in the process described with reference to FIG. 3(E) such that a depth (length) thereof exceeds that of the first external electrodes 24.

Next, the insulating layer 28 is cut away as indicated by a dotted line in FIG. 4(C) such that the end portions 22A of the second internal electrodes 22 are exposed, as shown in FIG. 4(D). Next, as shown in FIG. 4(E), the seed layer 58 is removed. Then, as shown in FIG. 4(F), the second external electrode 32 connected to the end portions 22A of the second internal electrodes 22, which are exposed in the process illustrated in FIG. 4(D), is formed on the whole surface of the insulating layer 28, thereby obtaining a capacitor element 12. A capacitor 10 was obtained by disposing a protective layer 34, terminal electrodes 40 and 42. In the thus obtained capacitor 10, an electric current flowing through the internal electrodes 20 has an opposite polarity to an electric current flowing through the internal electrodes 22, thereby reducing an ESL due to magnetic field offset.

Thus, in the Embodiment 1, a porous oxide substrate 52 obtained by anodic oxidation of a valve metal is used as the insulating layer 18 and the external electrodes 24 and 32 taking out a plurality of cylindrical first and second internal electrodes 20 and 22 are formed on one main surface of the dielectric layer 18 in parallel with each other. According to the Embodiment 1, the following advantageous effects are realized:
(1) Since electric current within the first internal electrodes 20 flows in the opposite direction to one within the second internal electrodes 22, ESL may be reduced due to magnetic field offset effect, thereby improving high frequency characteristics.
(2) A high capacity can be obtained since the first and second internal electrodes 20 and 22 are formed in a cylindrical shape to increase opposing area of conductor.
(3) Since a nano-scale pattern is unnecessary, simplification and lowered costs of the manufacturing process can be achieved.

Embodiment 2

Figure 5:
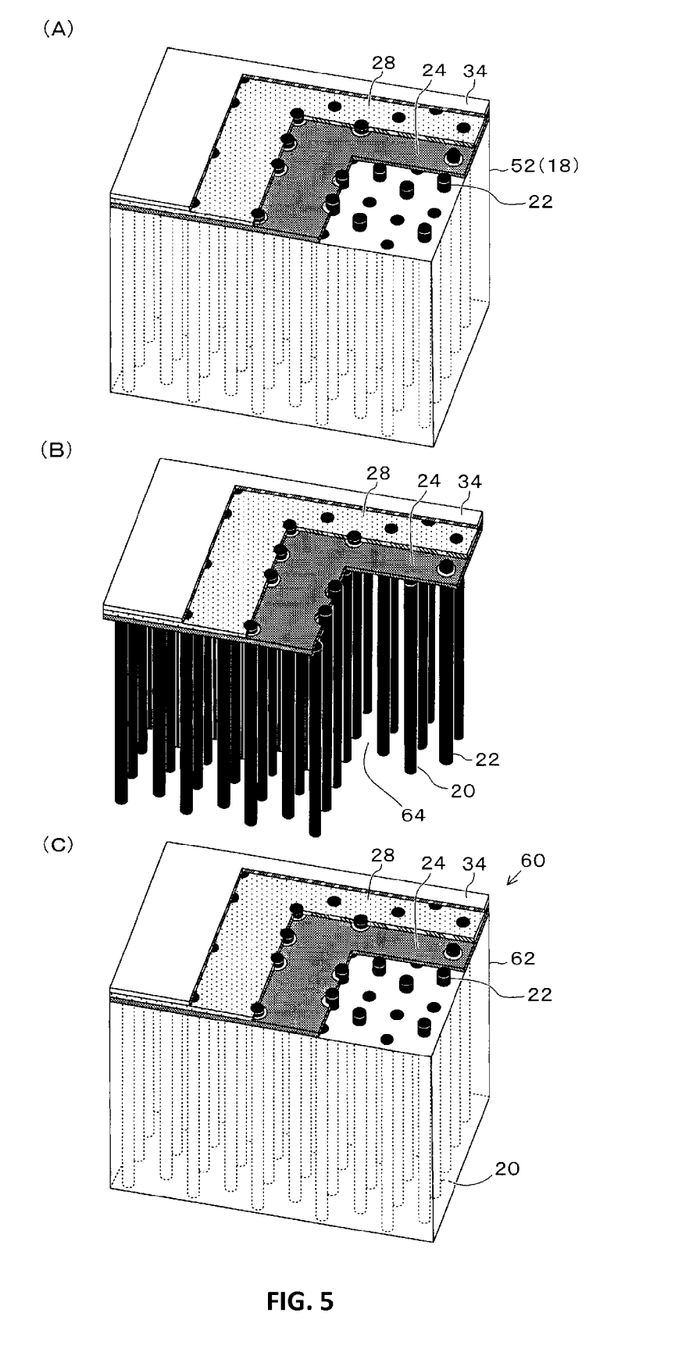
FIG. 5 shows a perspective view of manufacturing process of the Embodiment 2.

The Embodiment 2 of the present invention will be described first with reference to FIG. 5. In the figure, the same components as Embodiment 1 are denoted by the same reference numerals. FIG. 5 shows a perspective view of an example of manufacturing process of a capacitor element 60 according to the embodiment. The Embodiment 2 may use a wider range of materials for an insulating layer than the Embodiment 1 where only valve metal oxides are described as applicable material for the dielectric layer 18. As shown in FIG. 5(C), a capacitor element 60 according to Embodiment 2 includes a dielectric layer 62 and a plurality of cylindrical first and second internal electrodes 20 and 22 formed within the dielectric layer 62. The first and second internal electrodes 20 and 22 are connected to the first and second external electrodes 24 and 32 each formed on one main surface of the dielectric layer 62. The dimension of components of the capacitor element 62 is the same as the dimension in Embodiment 1. Material used for the internal electrodes 20 and 22, external electrodes 24 and 32, insulating layer 28, protective layer 34, and terminal electrodes 40 and 42 is the same as that in Embodiment 1. On the other hand, material used to form the dielectric layer 62 may include valve metal oxide (e.g., Al, Ta, Nb, Ti, Zr, Hf, Zn, W, or Sb) used in the Embodiment 1, multiple oxide (e.g., perovskite oxide such as $BaTiO_3$ and $SrTiO_3$) and/or resin.

This manufacturing method includes the same processes as Embodiment 1 from the two-staged anodization process for a metallic substrate through the process for forming the second external electrode 32. After forming the second external electrode 32 as indicated by FIG. 5(A), the dielectric layer 18 made of the oxide substrate 52 are removed by melting to expose the first and second internal electrodes 20 and 22. For example, if the electrode material is Ni and the oxide substrate 52 is made of $Al_2O_3$, NaOH is preferably used for selective removal. Next, a gap 64 is filled with another dielectric material to form the dielectric layer 62 as shown in FIG. 5(C). Since the internal electrodes 20 and 22 each has high aspect ratio, the above another dielectric material is preferably filled using a wet-method such as application or dipping in consideration of convenience of filling and Depo Rate. The another dielectric material noted above may be selected according to application of the capacitor element 60. If a valve metal oxide is to be used, a high capacitance may be obtained by filling with an oxide with relative permittivity higher than that of the removed oxide substrate 52, thereby improving reliability of the element. Thus, Embodiment 2 may enhance selectivity of material to form the dielectric layer 62, in addition to the advantageous effects of Embodiment 1.

The forgoing description of the invention is not intended to limit the invention to the disclosed examples. It will be understood by those of skill in the art that numerous and various modifications can be made without departing from the spirit of the present invention. The invention is not limited to the aforementioned embodiments, but various changes or modifications may be made to the extent not to depart from the spirit of the invention. For example, the following changes may be made:
(1) The shapes and/or dimensions described in the above embodiments are mere examples and various modifications may be made as necessary.
(2) Various known materials may be used. For example, various known anodically-oxidizable metals may be used in lieu of aluminum presented as an example of material for a metallic substrate to form the dielectric layer 18.
(3) An electrode withdrawal structure as indicated by the embodiments 1 and 2 may be available for design change as necessary to the extent to obtain the same effects as those of the embodiments.

INDUSTRIAL APPLICABILITY

According to various embodiments of the invention, a pair of external electrodes, each of which leads out a plurality of internal electrodes formed in cylindrical shape within holes of a porous dielectric material and having positive or negative polarity, are disposed at one main surface side in parallel with each other. As necessary, the porous dielectric material may be removed to fill with another dielectric material. Accordingly, an improved capacitance density can be obtained and high frequency characteristics (ESL reduction) can be achieved. In addition, a simplified manufacturing process and/or a wider range of selection of dielectric material can be achieved. Thus, various embodiments of the invention is applicable to a capacitor, more particularly, a high frequency capacitor.

LIST OF REFERENCE NUMBERS

10: capacitor
11: capacitor element
14: capacitance generating portion (internal electrode filled area)
16A, 16B: non-contributing portions (internal electrode non-containing area)
18: dielectric layer
20: first internal electrode (positive electrode)
20A: end portion
22: second internal electrode (negative electrode)
22A: end portion
24: first external electrode
26: opening
28: insulating layer
32: second external electrode
34: protective layer
26, 38: exposed part
40, 42: terminal electrode
50: metallic substrate
50A: surface
52 oxide substrate
52A, 52B: main surface
54: first holes
56: second holes
58: seed layer
60: capacitor element
62: dielectric layer
64: gap

What is claimed is:

1. A substantially cuboid or substantially cubic capacitor including a plurality of cylindrical internal electrodes each having a positive or negative polarity and formed within holes of a porous dielectric material, the capacitor comprising:
   a first external electrode layer formed on one main surface of the capacitor, the first external electrode layer electrically connected to more than one of said plurality of internal electrodes having one of positive or negative polarity, and the first external electrode layer being insulatingly pierced by more than one of said plurality of internal electrodes having the other of positive or negative polarity;
   an insulating layer formed on the first external electrode layer, the insulating layer being pierced by more than one of said plurality of internal electrodes having the other of positive or negative polarity; and
   a second external electrode layer formed on the insulating layer in parallel with the first external electrode layer, the second external electrode layer being electrically connected to said more than one of said plurality of internal electrodes having the other of positive or negative polarity.

2. The capacitor of claim 1, wherein the porous dielectric material is either of valve metal oxide, multiple oxide, or resin.

3. A method of manufacturing a capacitor using a porous oxide substrate obtained by anodizing a metal substrate, the method comprising:
   a first step of anodizing the metal substrate by applying a voltage to the metal substrate to form a plurality of cylindrical first holes, each of the plurality of first holes being opened in one main surface of the oxide substrate and having a predetermined depth in a thickness direction of the oxide substrate to be filled with electrode material;
   a second step of anodizing the metal substrate by applying a voltage higher than the voltage applied in the first step to form a plurality of second holes, each of the plurality of second holes having a pitch larger than that of the first holes and being randomly connected to leading ends of some of the first holes;
   a third step of removing the metal substrate and opening bottom surfaces of the second holes at the other main surface of the oxide substrate;
   a fourth step of forming a conductive seed-layer on an entire of said one main surface of the oxide substrate;
   a fifth step of forming first internal electrodes by filling the first holes connected to the second holes with the electrode material;
   a sixth step of cutting away the oxide substrate at the other main surface of the capacitor to expose end portions of the first internal electrodes by a thickness sufficient to open bottom surfaces of the first holes that are not provided with the first internal electrodes;
   a seventh step of forming a first electrode layer on the other main surface of the oxide substrate, the first electrode having an opening at a position corresponding to the first holes opened by the sixth step, and the first electrode being electrically connected the exposed end portions of the first internal electrodes;
   an eighth step of enlarging the opening of the first external electrode layer so as to have a larger diameter than that of the first holes to the extent not to reach the first internal electrodes that are connected to the first external electrode layer;
   a ninth step of forming an insulating layer on bottom and side surfaces of the first external electrode having the opening enlarged in the eighth step;
   a tenth step of forming second internal electrodes having a diameter substantially identical to that of the first holes by filling the opened first holes with electrode materials to the depth exceeding the first external electrode layer;
   an eleventh step of removing the insulating layer to expose end portions of the second internal electrode; and
   a twelfth step of removing the seed-layer and forming a second external electrode layer on the insulating layer such that the second external electrode layer is electrically connected to the end portions of the exposed second internal electrode.

4. The manufacturing method of claim 3 further comprising:
   a thirteenth step of removing the oxide substrate subsequent to the twelfth step; and
   a fourteenth step of filling gaps created between the first and second internal electrode in the thirteenth step with a dielectric material, the dielectric material is different from a material of the removed oxide substrate.

5. The manufacturing method of claim 4, wherein the dielectric material is either of a valve metal oxide, multiple oxide, or resin.

6. The manufacturing method of claim 5, wherein the dielectric material is a valve metal oxide having higher relative permittivity than that of the oxide substrate.

* * * * *